(12) United States Patent
Wacker et al.

(10) Patent No.: US 12,515,290 B2
(45) Date of Patent: Jan. 6, 2026

(54) HANDHELD WORK APPARATUS

(71) Applicant: Andreas Stihl AG & Co. KG, Waiblingen (DE)

(72) Inventors: Simon Wacker, Waiblingen (DE); Georg Heinzelmann, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 454 days.

(21) Appl. No.: 18/159,752

(22) Filed: Jan. 26, 2023

(65) Prior Publication Data
US 2023/0241755 A1 Aug. 3, 2023

(30) Foreign Application Priority Data
Jan. 28, 2022 (EP) .................................... 22154055

(51) Int. Cl.
*B23Q 11/00* (2006.01)
*B25F 5/02* (2006.01)
*B27B 17/00* (2006.01)

(52) U.S. Cl.
CPC ............ *B23Q 11/0089* (2013.01); *B25F 5/02* (2013.01); *B27B 17/00* (2013.01)

(58) Field of Classification Search
CPC ... B23Q 11/0078; B23Q 11/0089; B25F 5/02; B27B 17/00; B23B 2260/122; H01H 3/20; H01H 9/06; F16P 3/18; F16P 3/20
See application file for complete search history.

(56) References Cited

U.S. PATENT DOCUMENTS

| | | | | |
|---|---|---|---|---|
| 3,774,303 A * | 11/1973 | Burkett | .................... | B27B 17/00 30/382 |
| 3,873,796 A * | 3/1975 | Worobec, Jr. | ............ | H01H 3/20 200/332.2 |
| 4,406,066 A * | 9/1983 | Itzrodt | .................... | B27B 17/00 30/382 |
| 4,879,438 A * | 11/1989 | Winchester | .............. | H01H 9/06 310/50 |
| 4,896,425 A * | 1/1990 | Henriksson | ............. | B27B 17/00 30/381 |
| 5,065,476 A * | 11/1991 | Dohse | ................. | B27B 17/0008 16/426 |
| 5,212,886 A * | 5/1993 | Tasaki | .................... | B27B 17/00 30/381 |

(Continued)

FOREIGN PATENT DOCUMENTS

EP 3372348 A1 9/2018

*Primary Examiner* — Jason Daniel Prone
(74) *Attorney, Agent, or Firm* — Smartpat PLC

(57) ABSTRACT

A handheld work apparatus includes an actuating element (8) for actuating a drive motor (3), and a blocking element (9) arranged on a top side (6) of a handle portion (5). The blocking element (9) is operatively connected to the actuating element (8). A control circuit (17) for controlling the drive motor (3) is provided. A switch (15) can be actuated via the blocking element (9) and has a switching element (16). The switch (15) sends a signal to the control circuit (17) in an activated state. The switch (15) is arranged in the handle portion (5) between the blocking element (9) and a bottom side (7) of the handle portion (5) and is oriented such that the switching element (16) of the switch (15) faces the bottom side (7) of the handle portion (5).

15 Claims, 3 Drawing Sheets

(56) References Cited

U.S. PATENT DOCUMENTS

| | | | | |
|---|---|---|---|---|
| 5,483,727 | A * | 1/1996 | Chang | H01H 9/06 83/DIG. 1 |
| 5,577,600 | A * | 11/1996 | Schoene | H01H 3/20 200/321 |
| 5,638,945 | A * | 6/1997 | Fukinuki | H01H 3/20 200/43.16 |
| 5,724,737 | A * | 3/1998 | Stones | F16P 3/20 192/131 R |
| 5,862,713 | A * | 1/1999 | Tsunoda | F02D 11/02 30/381 |
| 6,108,916 | A * | 8/2000 | Zeiler | B27B 9/00 30/375 |
| 6,548,776 | B1 * | 4/2003 | Jong | H01H 3/20 200/334 |
| 7,000,593 | B2 * | 2/2006 | Muller | H01H 21/10 123/398 |
| 8,752,301 | B2 * | 6/2014 | George | B27B 17/00 30/381 |
| 9,353,721 | B2 * | 5/2016 | Eberle | B27B 17/083 |
| 9,636,792 | B2 * | 5/2017 | Mandalka | B23Q 11/0089 |
| 9,902,056 | B2 * | 2/2018 | Kaupp | B23Q 11/0089 |
| 10,014,128 | B2 * | 7/2018 | Kannan | B25F 5/02 |
| 10,293,445 | B2 * | 5/2019 | Gerstenberger | B23Q 11/0078 |
| 10,695,943 | B2 * | 6/2020 | Kachi | F16P 3/20 |
| 11,141,828 | B2 * | 10/2021 | Kolb | B25F 5/02 |
| 11,446,841 | B2 * | 9/2022 | Kachi | B27B 17/0008 |
| 12,064,894 | B2 * | 8/2024 | Schlosser | B25F 5/02 |
| 2003/0089575 | A1 * | 5/2003 | Jong | H01H 3/20 192/131 R |
| 2008/0011592 | A1 * | 1/2008 | Liebert | H01H 3/20 200/43.11 |
| 2010/0078298 | A1 * | 4/2010 | Freundt | H01H 9/26 200/43.18 |
| 2012/0023761 | A1 * | 2/2012 | Martinsson | B27B 17/0008 30/381 |
| 2018/0257191 | A1 | 9/2018 | Kolb et al. | |
| 2024/0100729 | A1 * | 3/2024 | Zhao | B25F 5/02 |

* cited by examiner

HANDHELD WORK APPARATUS

CROSS-REFERENCE TO RELATED APPLICATION

This application claims the benefit of European Patent Application No. 22154055.2, filed 28 Jan. 2022, the contents of which are incorporated in its entirety.

TECHNICAL FIELD

The disclosure relates to a handheld work apparatus such as a portable power tool.

BACKGROUND

Work apparatuses which comprise a housing, a drive motor arranged in the housing, and a tool driven by the drive motor are known. Corresponding work apparatuses have an actuating element for actuating the drive motor. The actuating element is operatively connected to a blocking element, with the blocking element blocking the actuating element in a blocking position and releasing it in an operating position. Furthermore, such work apparatuses can also have switches which, in addition to the blocking element, also have to be actuated in order to transmit a corresponding enable signal to a motor circuit of the work apparatus and thus enable the operation of the work apparatus.

SUMMARY

It has been found that with such work apparatuses malfunctions occur when the work apparatus is started or when it is in operation.

The invention is based on the object of creating a handheld work apparatus of the generic type that enables error-free start up and reliable operation of the work apparatus.

This object is achieved by a handheld work apparatus as claimed.

The inventors realized that the cause of faulty start up of the work apparatus or errors occurring during operation of the work apparatus can be the incorrect actuation of the switch. Such maloperations are partly caused by dirt in the handle of the work apparatus. Dirt can also accumulate on the switching element of the switch and impair its function. In particular, this can lead to the absence of an enable signal.

The work apparatus according to the disclosure comprises a housing, a drive motor arranged in the housing, a tool driven by the drive motor, and a handle portion formed on the housing. The handle portion has a top side, and a bottom side opposite the top side. Furthermore, the work apparatus includes an actuating element for actuating the drive motor and a blocking element arranged on the top side of the handle portion. The blocking element is operatively connected to the actuating element, with the blocking element blocking the actuating element in a blocking position and releasing it in an operating position. In addition, the work apparatus includes a control circuit for controlling the drive motor and a switch with a switching element that can be actuated via the blocking element. When activated, the switch sends a signal to the control circuit. The control circuit is designed such that the drive motor is enabled for operation only when the control circuit satisfies a group of operating conditions, with at least one operating condition of the group of operating conditions being the receipt of the signal from the switch. The switch is positioned in the handle portion between the blocking element and the bottom side of the handle portion and is oriented such that the switching element of the switch faces the bottom side of the handle portion.

The switch is oriented in such a way that its switching element faces the bottom side of the handle portion. As a result, the dirt in the handle portion is not deposited on the switching element, but rather falls in the direction of the bottom side of the handle portion when the work apparatus is held in the intended operating orientation. Soiling of the switching element and a resulting impairment of the function of the switch are reduced. Reliable operation of the switch is guaranteed. Consequently, reliable start up and reliable operation of the same are ensured.

It is advantageously provided that the blocking element is mounted on the housing so that it can pivot about a first pivot axis, with the blocking element having a first end which has a maximum end distance from the first pivot axis, measured radially with respect to the pivot axis, and that a maximum distance, measured radially with respect to the pivot axis, between the pivot axis and the switch is less than the end distance. The switch is preferably located between the first end and the first pivot axis in a direction from the first end toward the first pivot axis. The switch is thus below the blocking element. The switch is thereby additionally protected against dirt particles by the blocking element. The terms "below/down" and "above/up" refer to the direction of gravity. "Above/up" corresponds to a direction opposite to gravity, "below/down" corresponds to the direction of gravity. Such directional information relates to the work apparatus in an operating orientation intended for operation.

In particular, it is provided that the blocking element has a body which extends in the direction of the first pivot axis from a first longitudinal side to a second longitudinal side, with the switching element of the switch being arranged between the longitudinal sides in the direction of the first pivot axis. Thus, the switch is arranged below the blocking element also in a transverse direction, that is to say in the direction from the first to the second longitudinal side. This prevents the switch from being soiled by dirt particles entering the handle housing from above.

The switching element of the switch is preferably designed as a push button. The push button is a compact switching element and therefore forms little potential soiling surface, in particular compared to alternative switching elements, such as a switching tongue. Nevertheless, in an alternative embodiment, it can be expedient to also provide other switching elements.

It is advantageously provided that the switching element of the switch is at a distance from the pivot axis of the blocking element that is less than 80%, preferably less than 60%, of the end distance.

The blocking element preferably has a switching tongue for actuating the switching element of the switch. The switching tongue preferably has a bent end section, the bent end section serving to actuate the switch. In the blocking position the switching tongue is arranged between the bottom side of the handle portion and the switch. As a result, the switching tongue surrounds the switch and provides additional protection against soiling of the switching element.

A cleaning opening is preferably formed on the bottom side of the handle portion. Dirt can be removed from the bottom side of the handle portion via the cleaning opening.

It is preferably provided that the bent end section of the switching tongue is arranged adjacent to the cleaning opening in such a way that dirt in the handle portion is transported out of the cleaning opening via the switching tongue in the operating position of the blocking element. Thus, each time the blocking element is actuated, the bottom side is cleaned. The bottom side of the handle portion is thus freed from dirt on the bottom side with each actuation of the work apparatus. In this way, malfunctions caused by dirt in the handle portion can be avoided.

It is advantageously provided that the body of the blocking element has a first recess, wherein the switch is arranged in the first recess when the blocking element is in the operating position. Due to the arrangement of the switch in the first recess of the blocking element, the blocking element forms a kind of casing for the switch, which protects it from dirt.

The switching element of the switch is actuated by the blocking element when the blocking element is in the blocking position, as a result of which the switch is deactivated. The switching element of the switch is preferably unactuated when the blocking element is in the operating position, as a result of which the switch is activated. The switch preferably emits an enable signal only in its operating position, which is necessary for starting up the work apparatus. The consequence of this is that the control circuit has to receive an enable signal in order to be able to start the drive motor. If, for example, there is a break in the signal cable of the switch, an enable signal can no longer be transmitted. This prevents the work apparatus from being started up if the signal cable is broken.

It is preferably provided that the switch has an actuating spring that acts on the switching element, and that the blocking element is held in the blocking position by a return spring in the non-actuated state, with the return spring acting on the actuating spring of the switch in the blocking position of the blocking element in such a way that the switch is deactivated.

An embodiment of the invention is explained below with reference to the drawing.

DETAILED DESCRIPTION

Figure 1:
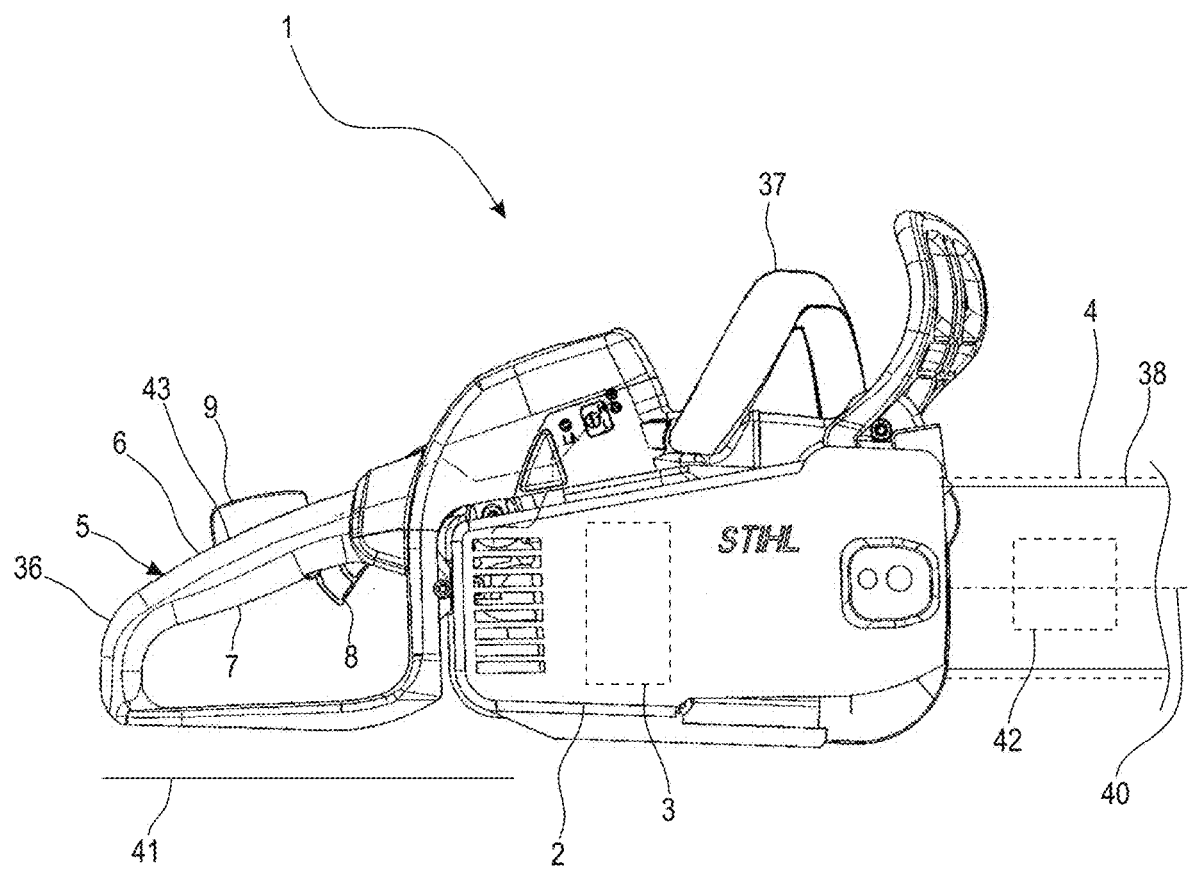
FIG. 1 shows a side view of a work apparatus in an operating orientation.

In FIG. 1 a work apparatus 1 is shown, which is designed as a motor chain saw. The work apparatus 1 comprises a housing 2, and a drive motor 3 arranged in the housing 2. The drive motor 3 is shown only schematically by a dashed rectangle. In the preferred exemplary embodiment, the drive motor 3 is an electric motor, but can alternatively also be designed as an internal combustion engine. The drive motor 3 is supplied with energy via a rechargeable battery or via a connecting cable. The work apparatus comprises a tool 4 driven by the drive motor 3, which is designed as a chainsaw chain in the exemplary embodiment. A rear handle 36 and a handle tube 37 for guiding the work apparatus 1 are fixed to the housing 2. A guide bar 38 protrudes forward on the side of the housing 2 opposite the rear handle 36. The chainsaw chain is arranged circumferentially on the guide bar 38. Alternatively, the hand held work apparatus can also be, for example, a cut-off grinder, a blower, a brush cutter, a hedge trimmer, or the like.

The drive motor 3 drives a drive shaft which protrudes from the housing 2. A drive sprocket is arranged on the drive shaft. The drive sprocket is used to drive the chainsaw chain, which is guided over the drive sprocket during operation. The work apparatus 1 also includes a tensioning device, via which the guide bar 38 can be displaced forwards in its longitudinal direction away from the drive sprocket and the chainsaw chain can thereby be tensioned.

As shown in FIG. 1, the guide bar 38 has a longitudinal axis 40. The longitudinal axis 40 runs centrally through the guide bar 38 approximately parallel to the horizontal floor 41 when the work apparatus 1 is placed on a level horizontal ground 41. The term "approximately" is to be understood such that the longitudinal axis 40 encloses an angle of at most 15° with the ground 41. The guide bar 38 has a longitudinal plane 42 which contains the longitudinal axis 40 and is perpendicular to the ground 41 when the work apparatus 1 is placed on a level horizontal ground 41.

As shown in FIG. 1, the housing 2 has a handle portion 5, the handle portion 5 being provided on the rear handle 36 in the exemplary embodiment. A blocking element 9 and an actuating element 8 are arranged on the handle portion 5. The actuating element 8 serves to actuate the drive motor 3. In the exemplary embodiment, the actuating element 8 is designed as an actuating lever. The blocking element 9 is operatively connected to the actuating element 8. The blocking element 9 blocks the actuating element 8 in a blocking position 11 (FIG. 3) and releases the actuating element 8 in an operating position 10 (FIG. 4). In the exemplary embodiment, the blocking element 9 is designed as a blocking lever.

As shown in FIG. 1, the handle portion 5 has a top side 6 and a bottom side 7 opposite the top side 6. In the exemplary embodiment, the blocking element 9 is arranged on the top side 6. The actuating element 8 is formed on the bottom side 7 of the handle portion 5. The handle portion 5 is a part of the housing 2 on which the actuating element 8 and the blocking element 9 are arranged. The handle portion 5 preferably also includes a handle area 43 which is provided for holding the work apparatus 1 when the work apparatus 1 is in operation.

Figure 2:
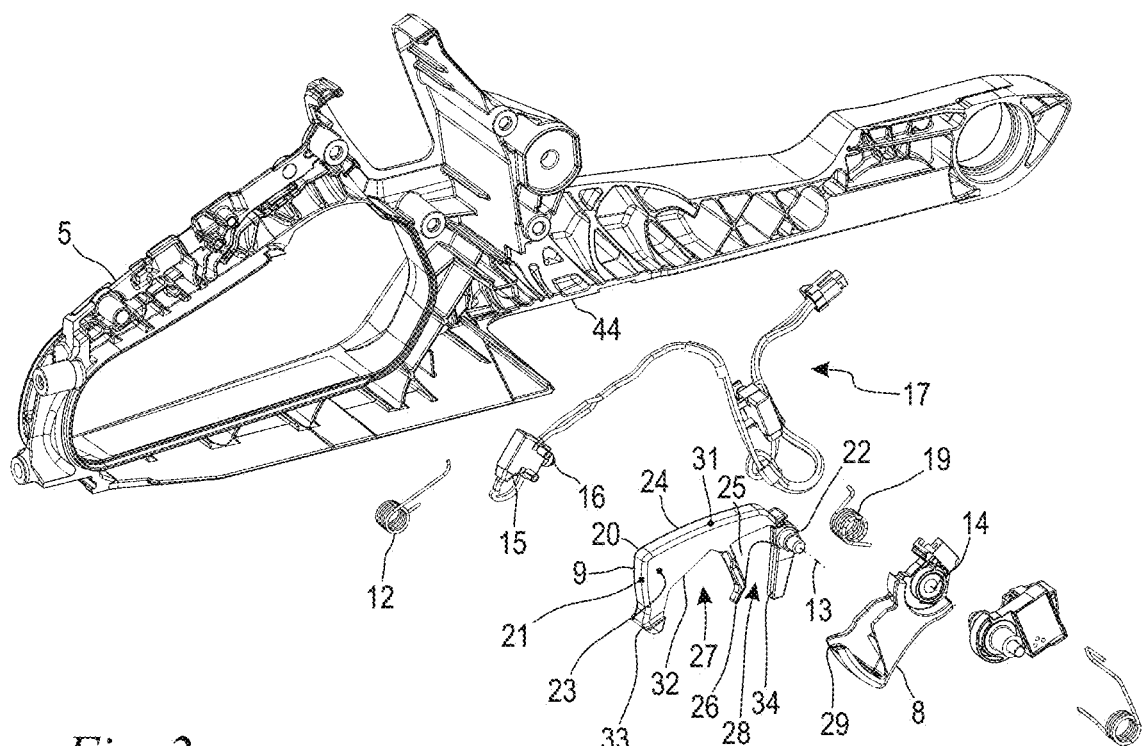
FIG. 2 shows an exploded view of a handle portion with blocking element, actuating element, and switch.

A housing part 44 which serves as a structural element of the work apparatus 1 is shown in FIG. 2. The drive motor 3, the guide bar 38, the actuating element 8, the blocking element 9 and other components of the work apparatus 1 are held directly or indirectly on the housing part 44. Furthermore, the housing part 44 at least partially forms a rear handle 36 (FIG. 1) of the work apparatus 1 with the handle portion 5.

Figure 3:
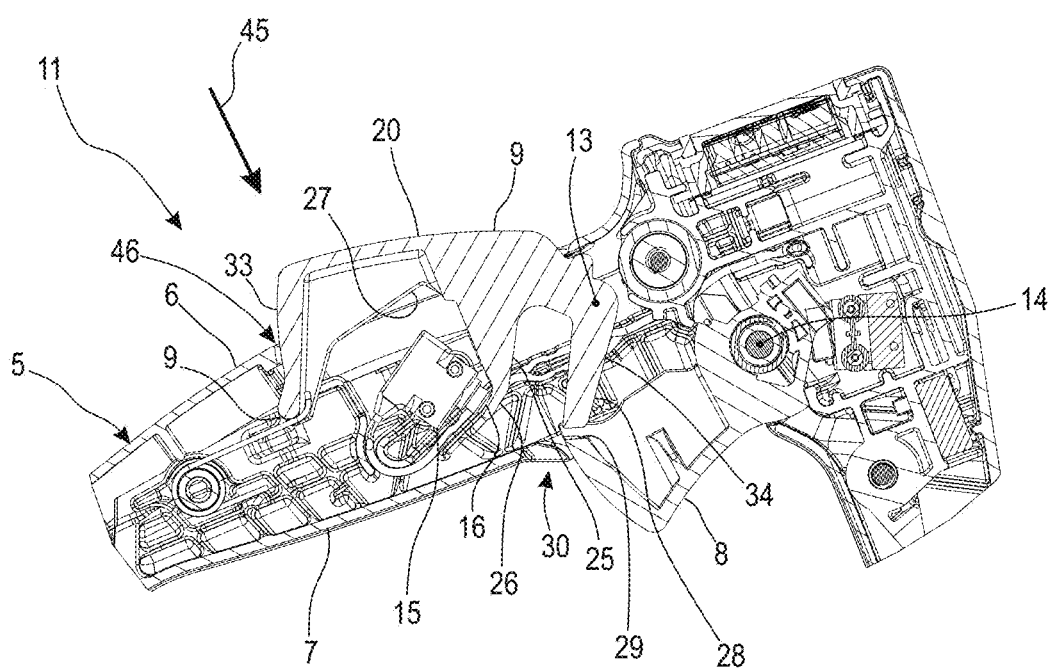
FIG. 3 shows a partial cross section of a handle portion in the blocking position.
Figure 4:
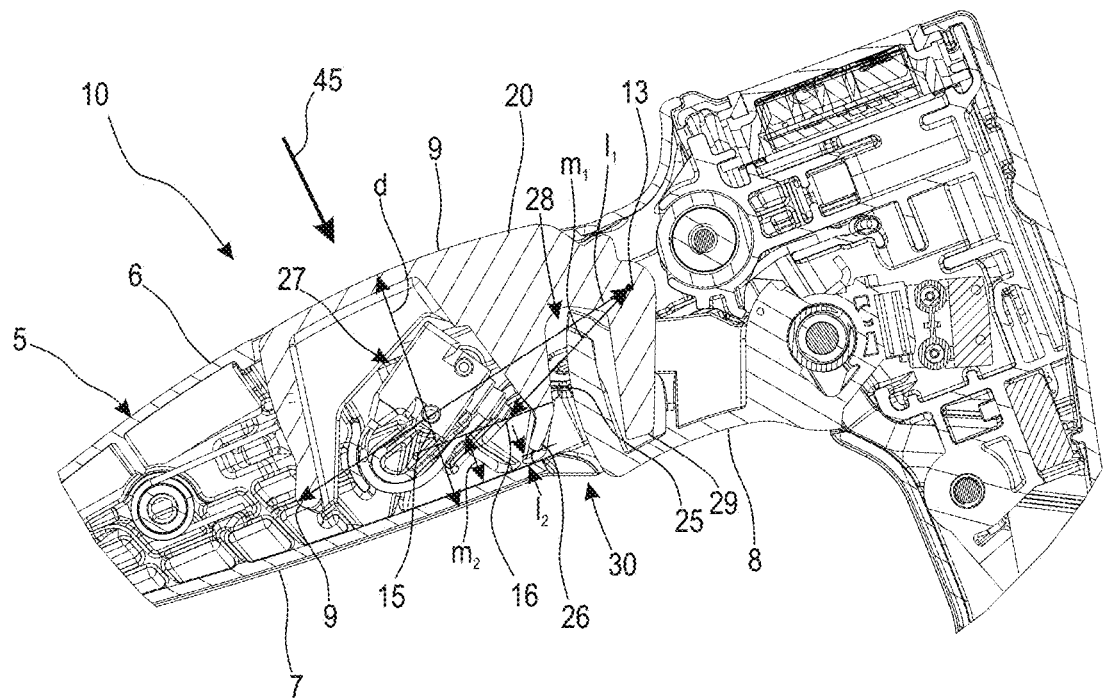
FIG. 4 shows a partial cross section of the handle portion with the blocking lever in the operating position.

As shown in FIGS. 2 and 3, the blocking element 9 is mounted on the handle portion 5 so that it can pivot about a first pivot axis 13. The work apparatus 1 comprises a first return spring 12. The first return spring 12 acts on the blocking element 9 and prestresses the blocking element 9 into the blocking position 11. In the exemplary embodiment, the first return spring 12 is designed as a torsion spring. The return spring 12 is arranged on the handle portion 5 and acts with one leg on the blocking element 9.

As shown in FIGS. 2 and 3, the actuating element 8 is mounted on the handle portion 5 so that it can pivot about a second pivot axis 14. The work apparatus 1 has a second return spring 19, wherein the second return spring 19 acts on the actuating element 8 and biases the actuating element 8 into an inoperative position in which the drive motor 3 is not actuated. A first leg 33 and a second leg 34 are formed on the blocking element 9, wherein the second leg 34 is operatively connected to a holding contour 29 of the actuating element 8. If the blocking element 9 is in the blocking position 11, the second leg 34 of the blocking element 9 is aligned in such a way that the end face of the second leg 34 blocks pivoting of the actuating lever 8 into a position in which the drive motor 3 is actuated via the holding contour 29. The second leg 34 only releases the holding contour 29 of the actuating element 8 when the blocking element 9 is pivoted, as a result of which the actuating element 8 can be pivoted.

As shown in FIGS. 2 and 3, the work apparatus 1 includes a switch 15 with a switching element 16. The switch 15 is held on the housing 2. The switch 15 can be actuated by means of the blocking element 9. If the switch 15 is activated, it emits a signal.

The work apparatus also includes a control circuit 17. The control circuit 17 is used to control the drive motor 3. The control circuit 17 is designed in such a way that the drive motor 3 is enabled only when the control circuit 17 satisfies a group of operating conditions. At least one operating condition of the group of operating conditions is the receipt of the signal sent by the switch 15. In an alternative embodiment of the work apparatus 1 it can also be provided to provide further operating conditions, such as the activation of an on/off switch of the work apparatus 1, which when met enable the operation of the drive motor 3 by the control circuit 17. In order to activate the drive motor 3, the blocking element 9 must be pressed. As a result, on the one hand the actuating element 8 is released mechanically and on the other hand the switch 15 is activated, as a result of which the drive motor 3 is also enabled by the control circuit 17.

In the preferred exemplary embodiment, the control circuit 17 is designed as a computer-based control unit which is used for computer-aided signal processing. Consequently, the signal sent by the switch 15 can be an information signal that is further processed in the control unit. Furthermore, it can be expedient to provide only an electronic circuit as the control circuit 17. In such an embodiment, the absence of an enable signal corresponds to an interruption of the circuit by the switch, and the presence of an enable signal corresponds to the closing of the circuit to start up the drive motor 3.

As shown in FIGS. 2 and 3, the blocking element 9 comprises a switching tongue 25 for actuating the switching element 16 of the switch 15. As shown in FIG. 3, the switch 15 is actuated by the blocking element 9 when the blocking element 9 is in the blocking position 11. In the actuated state of the switch 15, the switching tongue 25 of the blocking element 9 contacts the switching element 16 of the switch 15. In the actuated (depressed) position of the switch 15, the switch 15 is deactivated, according to which the switch 15 does not emit a signal to the control circuit 17. If the blocking element 9 is actuated by the operator into the operating position 10 of the blocking element 9, the switching tongue 25 of the blocking element 9 releases the switching element 16 of the switch 15. The switching tongue 25 of the blocking element 9 is at a distance from the switching element 16 of the switch 15 when the switch 15 is not actuated. There is no contact between the switching tongue 25 and the switching element 16. In the non-actuated position of the switch 15, the switch 15 is activated, according to which the switch 15 does emit a signal to the control circuit 17. The control circuit 17 enables the drive motor 3 to operate. The switch 15 has an actuating spring, not shown in detail, which acts on the switching element 16. In the blocking position 11 of the blocking element 9, the return spring 12 acts on the blocking element 9 in such a way that the switching element 16 of the switch 15 is tensioned into the actuated position against the spring force of the actuating spring. The switch 15 is consequently deactivated. In the preferred exemplary embodiment, the switching element 16 is designed merely as a push button, so that the blocking element 9 contacts the push button directly. The switch 15 may in particular be a normally closed push button switch. In an alternative embodiment of the work apparatus 1, it can also be expedient to provide a switching tongue on the switch 15 in addition to the push button.

As shown in FIGS. 3 and 4, the switch 15 is arranged between a part of the blocking element 9 and the bottom side 7 of the handle portion 5. The switch 15 and the blocking element 9 are arranged relative to one another such that in a viewing direction 45 from the top side 6 of the handle portion to the bottom side 7 of the handle portion 5, the switch 15 is at least partially, preferably completely, covered by the blocking element 9. The switching element 16 of the switch 15 is completely covered by the blocking element 9 in a viewing direction 45 from the top side 6 of the handle portion to the bottom side 7 of the handle portion 5. The viewing direction 45 described is perpendicular to the pivot axis 13 of the blocking element 9. The switch 15 is arranged in the handle portion 5 in such a way that the switching element 16 of the switch 15 faces the bottom side 7 of the handle portion 5.

As shown in FIGS. 3 and 4, a part of the blocking element 9, in particular the switching tongue 25, is arranged between the switch 15 and the bottom side 7 of the handle portion 5. The switching tongue 25 thus extends below the switch 15.

As shown in FIGS. 2, 3 and 4, the blocking element 9 has a body 20 which extends from a first end face 21 to a second end face 22. The pivot axis 13 of the blocking element 9 lies between the first end 21 and the second end 22 of the body 20. The end faces 21, 22 of the body 20 are connected to one another via a first longitudinal side 23 and a second longitudinal side 24. The body 20 of the blocking element 9 extends along the first pivot axis 13 from its first longitudinal side 23 to its second longitudinal side 24. Furthermore, the end faces 21, 22 are connected to one another via a top side 31 and a bottom side 32. The bottom side 32 of the body 20 faces the bottom side 7 of the handle portion 5. The top side 31 of the body 20 faces away from the bottom side 7 of the handle portion 5.

As shown in FIGS. 2 to 5, the body 20 of the blocking element 9 comprises the first leg 33, which is formed at its first end face 21, and the second leg 34, which is formed at its second end face 22. The switching tongue 25 of the body 20 is arranged between the first leg 33 and the second leg 34. In the operating position 10 of the blocking element 9 the two legs 33, 34 and the switching tongue 25 extend in their longitudinal direction in the direction from the top side 6 of the handle portion 5 to the bottom side 7 of the handle portion 5. The body 20 of the blocking element 9 comprises a first recess 27 and a second recess 28. The first recess 27 is formed between the first leg 33 and the switching tongue 25. The second recess 28 is formed between the switching tongue 25 and the second leg 34.

As shown in FIG. 4, the first recess 27 is formed in such a way that the switch 15 is preferably arranged completely in the first recess 27 when the blocking element 9 is in the operating position 10. Accordingly, when the blocking element 9 is in the operating position 10, the switch 15 is located laterally between the first leg 33 and the switching tongue 25 of the body 20 of the blocking element 9. In other words, the switch 15 is surrounded by the first leg 33 and the switching tongue 25. The second recess 28 of the body 20 is designed such that the holding contour 29 of the actuating element 8 is arranged in the second recess 28 of the body 20 of the blocking element 9 when the blocking element 9 is in the operating position 10.

As shown in FIGS. 3 and 4, the switch 15 is arranged underneath at least a part of the blocking element 9. The blocking element 9 thus forms a kind of protective device against soiling of the switch 15. The switch 15 is arranged in a direction from the first end 21 to the second end 22 in relation to the operating position 10 of the blocking element 9 between the first end 21 and the second end 22 of the body. Furthermore, the switch 15 is arranged at least partially, in particular completely, between the first longitudinal side 23 and the second longitudinal side 24 in the direction of the first pivot axis 13. The switch 15 is particularly preferably aligned with the blocking element 9 such that the switching element 16 is arranged completely between the first longitudinal side 23 and the second longitudinal side 24 of the body 20 of the blocking element 9.

As shown in FIGS. 3 and 4, the first end 21 of the body 20 has a maximum end distance $l_1$ from the first pivot axis 13, measured radially to the pivot axis 13 of the blocking element 9. The switch 15 is arranged between the pivot axis 13 and the first end 21 of the body 20. A maximum distance $m_1$, measured radially to the pivot axis 13, between the switch 15 and the pivot axis 13 is preferably less than the end distance $l_1$. In the preferred embodiment, the switching element 16 of the switch 15 has a distance $m_1$ from the pivot axis 13 of the blocking element 9, which is less than 80%, preferably less than 60%, of the end distance $l_1$. The switching element 16 of the switch 15 preferably has a ground distance $m_2$ from the bottom side 7 of the handle portion 5, the distance $m_2$ corresponding to at least 15%, preferably approximately 20%, of the maximum distance d between the top side 6 and the bottom side 7 of the handle portion 5 in the region of the switch.

As shown in FIGS. 3 and 4, the switching tongue 25 comprises a bent end section 26. The bent end section 26 of the switching tongue 25 serves to actuate the switching element 16. As a result of the bend, the switching tongue 25 can actuate the switching element 16 of the switch 15, although the switching element 16 of the switch 15 is aligned with the bottom side 7 of the handle portion 5 and the body 20 of the blocking lever 9 is arranged essentially above the switch 15. The bent end section 26 of the switching tongue 25 is arranged at least partially between the bottom side 7 of the handle portion 5 and the switch 15. In the operating position 10 of the blocking lever 9, a distance 12 of the bent end section 26 from the bottom side 7 of the handle portion 5 is less than 20% of the ground distance m2 between the switching element 16 and the bottom side 7 of the handle portion 5. By means of the bent end section 26, the switching tongue 25 engages around the switch 15 and thereby offers additional protection against dirt.

Figure 5:
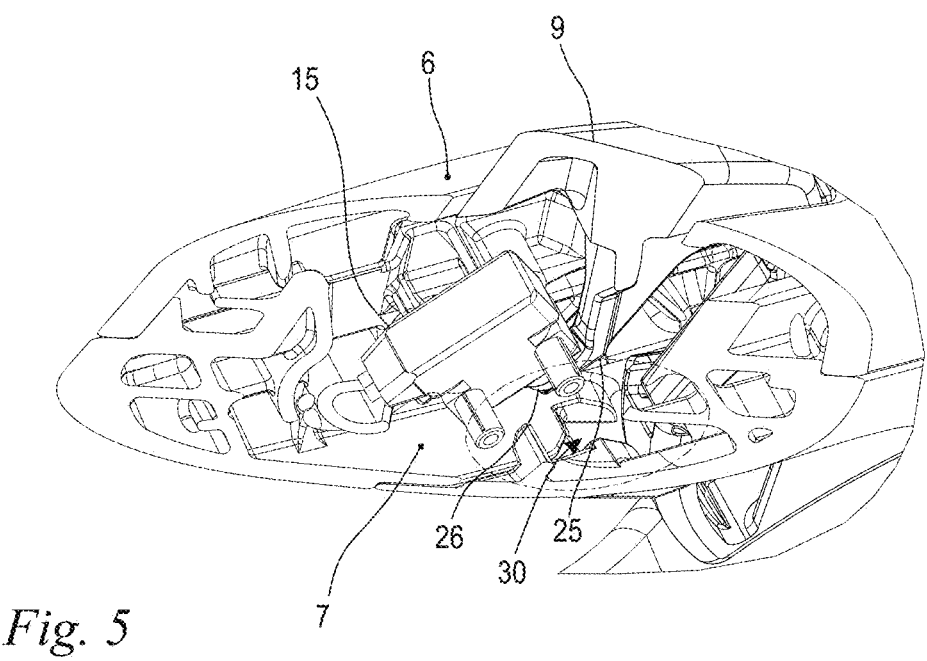
FIG. 5 shows a partial perspective view of the underbody of the handle portion with cleaning opening.

As shown in FIGS. 3 to 5, a cleaning opening 30 is formed on the bottom side 7 of the handle portion 5. Dirt in the interior space of the handle portion 5 can be pushed out via the cleaning opening 30. In the operating position 10 of the blocking element 9, the bent end section 26 of the switching tongue 25 is arranged adjacent to the cleaning opening 30 in such a way that dirt in the handle portion 5 is conveyed out of the cleaning opening 30 via the switching tongue 25. The cleaning opening 30 is also arranged adjacent to the holding contour 29 of the actuating element 8 in the unactuated state. The cleaning opening 30 extends in a longitudinal direction and/or in a transverse direction to an extent which corresponds to at least 40%, preferably at least 60%, in particular at least 80% of the distance between the first longitudinal side 23 of the body 20 of the blocking element 9 and the second longitudinal side 24 of the body 20 of the blocking element 9. The transverse direction of the cleaning opening 30 preferably corresponds approximately to the distance between the first longitudinal side 23 of the body 20 of the blocking element 9 and the second longitudinal side 24 of the body 20 of the blocking element 9. Dirt can thus be pushed effectively through the cleaning opening 30 over the entire width of the switching tongue 25. In addition, a lever opening 46 is provided on the top side 6 of the handle portion 5, through which opening the blocking element 9 dips into the blocking position 11 of the blocking element 9 and projects out of the handle portion 5. The operator can thus actuate the blocking element 9. The maximum distance between the blocking element 9 and the handle portion 5 in the region of the lever opening 46 is smaller than the transverse direction and/or the longitudinal direction of the cleaning opening 30. This ensures that dirt particles which pass into the handle portion 5 via the lever opening 46 can be conveyed out of the handle portion 5 again through the cleaning opening 30.

What is claimed is:

1. A handheld work apparatus, comprising:
    a housing (2);
    a drive motor (3) arranged in the housing (2);
    a tool (4) operatively connected to and driven by the drive motor (3);
    a handle portion (5) formed on the housing (2),
        wherein the handle portion (5) has a top side (6) and a bottom side (7) opposite the top side (6), the top side (6) being positioned above the bottom side (7) when the handheld work apparatus is oriented in an operating orientation;
    an actuating element (8) for actuating the drive motor (3), the actuating element (8) being arranged on the bottom side (7) of the handle portion (5) and being movable between an inoperative position and an actuated position;
    a blocking element (9) arranged on the top side (6) of the handle portion (5),
        wherein the blocking element (9) is movable between a blocking position (11) and an operating position (10),
        wherein the blocking element (9) cooperates with the actuating element (8), and
        wherein, in the blocking position (11), the blocking element (9) blocks the actuating element (8) in the inoperative position, and
        wherein, in the operating position (10), the blocking element (9) releases the actuating element (8) so that the actuating element (8) is movable from the inoperative position to the actuated position;
    a control circuit (17) for controlling the drive motor (3), the control circuit (17) being arranged in the housing (2); and
    a switch (15) with a switching element (16), wherein the blocking element (9) actuates the switching element (16) when the blocking element (9) is in the blocking position (11),
    wherein the switch (15) is in communication with the control circuit (17) and, in an activated state, sends a signal to the control circuit (17),
    wherein the control circuit (17) is designed such that the drive motor (3) is enabled for operation only when the control circuit (17) receives the signal of the switch (15), and wherein the switch (15) is arranged in the handle portion (5) between the blocking element (9) and the bottom side (7) of the handle portion (5) and is oriented such that the switching element (16) of the switch (15) faces the bottom side (7) of the handle portion (5).

2. The handheld work apparatus according to claim 1,
wherein the blocking element (9) is pivotable about a first pivot axis (13) between the blocking position (11) and the operating position (10), and
wherein the blocking element (9) has a first end (21) which has a maximum end distance ($l_1$), measured radially to the first pivot axis (13), from the first pivot axis (13), and
wherein a maximum distance, measured radially to the first pivot axis (13), between the switch (15) and the first pivot axis (13) is less than the maximum end distance ($l_1$).

3. The handheld work apparatus according to claim 2,
wherein the switch (15) is arranged between the first end (21) and the first pivot axis (13) when the blocking element (9) is in the blocking position (11).

4. The handheld work apparatus according to claim 2,
wherein the blocking element (9) has a body (20) which extends from a first longitudinal side (23) in a first plane to a second longitudinal side (24) in a second plane, and
wherein the switching element (16) of the switch (15) is arranged between the first plane and the second plane.

5. The handheld work apparatus according to claim 4,
wherein the body (20) of the blocking element (9) has a first recess (27), wherein the switch (15) is arranged in the first recess (27) when the blocking element (9) is in the operating position (10).

6. The handheld work apparatus according to claim 2,
wherein the switching element (16) of the switch (15) has a distance ($m_1$) from the first pivot axis (13) of the blocking element (9) which is less than 80% of the maximum end distance ($l_1$).

7. The handheld work apparatus according to claim 1,
wherein the switching element (16) of the switch (15) is a push button.

8. The handheld work apparatus according to claim 1,
wherein the blocking element (9) has a switching tongue (25) for actuating the switching element (16) of the switch (15).

9. The handheld work apparatus according to claim 8,
wherein the switching tongue (25) has a bent end section (26), and
wherein the bent end section (26) serves to actuate the switch (15).

10. The handheld work apparatus according to claim 9,
wherein a cleaning opening (30) is formed on the bottom side (7) of the handle portion (5).

11. The handheld work apparatus according to claim 10,
wherein, in the operating position (10) of the blocking element (9), the bent end section (26) of the switching tongue (25) is arranged adjacent to the cleaning opening (30) in such a way that dirt in the handle portion (5) is conveyed out of the cleaning opening (30) via the switching tongue (25).

12. The handheld work apparatus according to claim 8,
wherein the switching tongue (25) is arranged between the bottom side (7) of the handle portion (5) and the switch (15) when in the blocking position.

13. The handheld work apparatus according to claim 1,
wherein the switching element (16) of the switch (15) is depressed by the blocking element (9) when the blocking element (9) is in the blocking position (11), whereby the switch (15) is deactivated.

14. The handheld work apparatus according to claim 1,
wherein the switching element (16) of the switch (15) is not depressed when the blocking element (9) is in the operating position (10), whereby the switch (15) is activated.

15. The handheld work apparatus according to claim 1,
wherein the switch (15) has an actuating spring acting on the switching element (16), and
wherein the blocking element (9) is held in the blocking position (11) via a first return spring (12) when not actuated, and
wherein the first return spring (12) acts on the actuating spring of the switch (15) such that the switch (15) is deactivated when the blocking element (9) is in the blocking position (11).

* * * * *